US006590589B1

(12) United States Patent
Sluiman et al.

(10) Patent No.: US 6,590,589 B1
(45) Date of Patent: Jul. 8, 2003

(54) AUTOMATIC GENERATION OF FASTPATH APPLICATIONS

(75) Inventors: Harm Sluiman, Scarborough (CA); Hetty Dougherty, San Jose, CA (US); Dorian Birsan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,084

(22) Filed: Nov. 29, 1999

(30) Foreign Application Priority Data

Nov. 30, 1998 (CA) .............................................. 2225021

(51) Int. Cl.[7] .............................................. G06F 9/00
(52) U.S. Cl. ......................................... 345/751; 717/10
(58) Field of Search ................................ 345/751, 759, 345/762, 765, 744; 717/10, 11, 12, 14, 15

(56) References Cited

U.S. PATENT DOCUMENTS 6,249,291 B1 * 6/2001 Popp et al. ................. 345/473
6,289,513 B1 * 9/2001 Bentwich .................... 717/11
6,314,408 B1 * 11/2001 Salas et al. ................. 705/54

* cited by examiner

Primary Examiner—Cao (Kevin) Nguyen
(74) Attorney, Agent, or Firm—Steven W. Roth

(57) ABSTRACT

A computer system having a graphical system user interface for accepting input from a user to create objects in an object-oriented computing environment. The system user interface generates an XML-compliant template file reflecting the work-flow defined by input fiom the user. A macro list generator displays a representation of the template file and prompts for user interface customization options based on the template file. The macro list generator generates an XML-compliant macro list file reflecting interface customization. The system has a custom interface generator to present the customized interface to the user, having prompts derived from the macro list data. The customized interface generator accepts input from the user in response to the customized interface prompts and generates an XML-compliant application file corresponding to the template file as modified to reflect responses of the user to the customized interface prompts.

15 Claims, 7 Drawing Sheets

AUTOMATIC GENERATION OF FASTPATH APPLICATIONS

FIELD OF THE INVENTION

The present invention is directed to an improvement in computing systems and in particular to a computer system that provides improved application construction.

BACKGROUND OF THE INVENTION

In computer systems, and in particular in object oriented computer systems, programmers and system users define applications using standard user interfaces. Users are provided with appropriate functions in the user interface to permit different applications to be constructed. When multiple applications being generated by a user are very similar to each other, or share common aspects, the user must replicate the work-flow followed in generating a first application in later application generation steps. This replication by the user is inefficient and also permits errors to be made when the user does not successfully replicate the first application.

In prior art systems, scripts or macros can be "recorded" and edited. In such systems the keystrokes and/or pointer commands of a user are captured in a data file for future use. The exact keystrokes may be replayed by invoking the appropriate script or macro name. In such systems it is also possible to edit such files to permit changes to be made to the sequence of keystrokes stored in the script or macro file.

Such systems typically work on a text or GUI-based level. In other words, the information which is stored is a representation of the input commands which the user generates for a particular interface for a particular sequence of commands or operations. A stored file is "replayed" to recreate the steps originally taken by the user, the file to be replayed takes the place of input from the keyboard or other input device of the user. The script or macro file in such a system is by definition closely tied to the specific system and the specific set of commands or operations which the user invokes.

Such systems are useful when a rote series of steps is to be retraced a number of times, or when a user is sophisticated enough to program directly in the script or macro language. Such systems do not, however, provide the user with a macro or script which is based on an object-oriented representation, rather than a text based representation, of the steps to be replicated. Such systems also do not typically provide a powerful mechanism for generalizing or customizing the macro or script file.

SUMMARY OF THE INVENTION

According to one aspect of the present invention, there is provided an improved system for generating applications.

According to another aspect of the present invention, there is provided a computer program product for generating user interfaces having a system user interface for accepting input from a user, the system user interface generating template data reflecting the work-flow defined by input from the user, a macro list generator for displaying a representation of the template data and for accepting input representing user preferences for interface customization based on the template data, the macro list generator generating macro list data reflecting the input representing user preferences for interface customization, a custom interface generator for presenting a customized interface to the user, the customized interface comprising prompts derived from the macro list data, the customized interface generator accepting input from the user in response to the customized interface prompts and further comprising an application generator for generating application data corresponding to the template data as modified to reflect responses of the user to the customized interface prompts.

According to another aspect of the present invention, there is provided a computer program product as described above in which the template data, the macro list data and the application data are in the form of XML-compliant code, the accepting input representing user preferences further comprises prompting for each element and attribute defined in the XML-compliant code of the template data.

According to another aspect of the present invention, there is provided a computer program product as described above further comprising prompts for user preferences for customization of the template data comprising a set of prompts selected from a master set of prompts comprising prompts for interface labels, interface descriptions, attribute default values, element default values, input field prefixes, input field suffixes, element repeatability, input field constraints, help text, interface new page control, and help file location.

According to another aspect of the present invention, there is provided a computer system comprising a graphical system user interface for accepting input from a user to create objects in an object-oriented computing environment, the system user interface generating a template file reflecting the work-flow defined by input from the user, a macro list generator for displaying a representation derived from the template file and for accepting input representing user preferences for interface customization based on the template file, the macro list generator generating a macro list file reflecting the input representing user preferences for interface customization, a custom interface generator for presenting a customized interface to the user, the customized interface comprising prompts derived from the macro list data, the customized interface generator accepting input from the user in response to the customized interface prompts and further comprising an application generator for generating an application file corresponding to the template file as modified to reflect responses of the user to the customized interface prompts.

According to another aspect of the present invention, there is provided a method for generating fastpath applications comprising the steps of:

1. accepting input from a user;
2. generating template data reflecting the work-flow defined by input from the user;
3. displaying a representation of the template data;
4. accepting input representing user preferences for interface customization based on the template data;
5. generating macro list data reflecting the input representing user preferences for interface customization;

6. presenting a customized interface to the user, the customized interface comprising prompts derived from the macro list data;
  7. accepting input from the user in response to the customized interface prompts; and
  8. generating application data corresponding to the template data as modified to reflect responses of the user to the customized interface prompts.

According to another aspect of the present invention, there is provided a method for generating fastpath applications comprising the steps of:

1. accepting input from a user to create objects in an object-oriented computing environment;
  2. generating a template file reflecting the work-flow defined by input from the user;
  3. displaying a representation derived from the template file;
  4. accepting input representing user preferences for interface customization based on the template file;
  5. generating a macro list file reflecting the input representing user preferences for interface customization;
  6. presenting a customized interface to the user, the customized interface comprising prompts derived from the macro list data, the customized interface generator accepting input from the user in response to the customized interface prompts; and
  7. generating a application file corresponding to the template file as modified to reflect responses of the user to the customized interface prompts.

According to another aspect of the present invention, there is provided an article of manufacture including a computer usable medium having computer readable program code embodied therein, the computer readable program code in the article of manufacture including computer readable program code for causing a computer to carry out the steps in the methods set out above.

According to another aspect of the present invention, there is provided a computer program product for use with an object-oriented computer system, the computer program product including a computer usable medium having computer readable program code embodied in the medium for automatic application generation, the computer program product including:

computer readable program code for causing a computer to accept input from a user, computer readable program code for causing a computer to generate template data reflecting the work-flow defined by input from the user, computer readable program code for causing a computer to display a representation of the template data, computer readable program code for causing a computer to accept input representing user preferences for interface customization based on the template data, computer readable program code for causing a computer to generate macro list data reflect the input representing user preferences for interface customization, computer readable program code for causing a computer to present a customized interface to the user, the customized interface comprising prompts derived from the macro list data, computer readable program code for causing a computer to accept input from the user in response to the customized interface prompts and computer readable program code for causing a computer to generate application data corresponding to the template data as modified to reflect responses of the user to the customized interface prompts.

According to another aspect of the present invention, there is provided a computer program product for use with an object-oriented computer system, the computer program product comprising, a computer usable medium having computer readable program code embodied in the medium for automatic application generation, the computer program product comprising computer readable program code for causing a computer to accept input from a user to create objects in an object-oriented computing environment, computer readable program code for causing a computer to generate a template file reflecting the work-flow defined by input from the user, computer readable program code for causing a computer to display a representation derived from the template file, computer readable program code for causing a computer to accept input representing user preferences for interface customization based on the template file, computer readable program code for causing a computer to generate a macro list file reflecting the input representing user preferences for interface customization, computer readable program code for causing a computer to present a customized interface to the user, the customized interface comprising prompts derived from the macro list data, and accepting input from the use in response to the customized interface prompts and computer readable program code for causing a computer to generate an application file corresponding to the template file as modified to reflect responses of the user to the customized interface prompts.

Advantages of the present invention include the ability to define a template which is customizable to generate applications without requiring users to retrace all steps in the application-generation path. The natural work-flow of the user is captured by the template file and this work-flow representation is then used to permit other applications to be quickly defined by the user. The user may effectively create customized user interfaces based on the template file to permit the creation of modified applications based on the template file.

BRIEF DESCRIPTION OF THE DRAWINGS

The preferred embodiment of the invention is shown in the drawings, wherein.

Figure 1A:
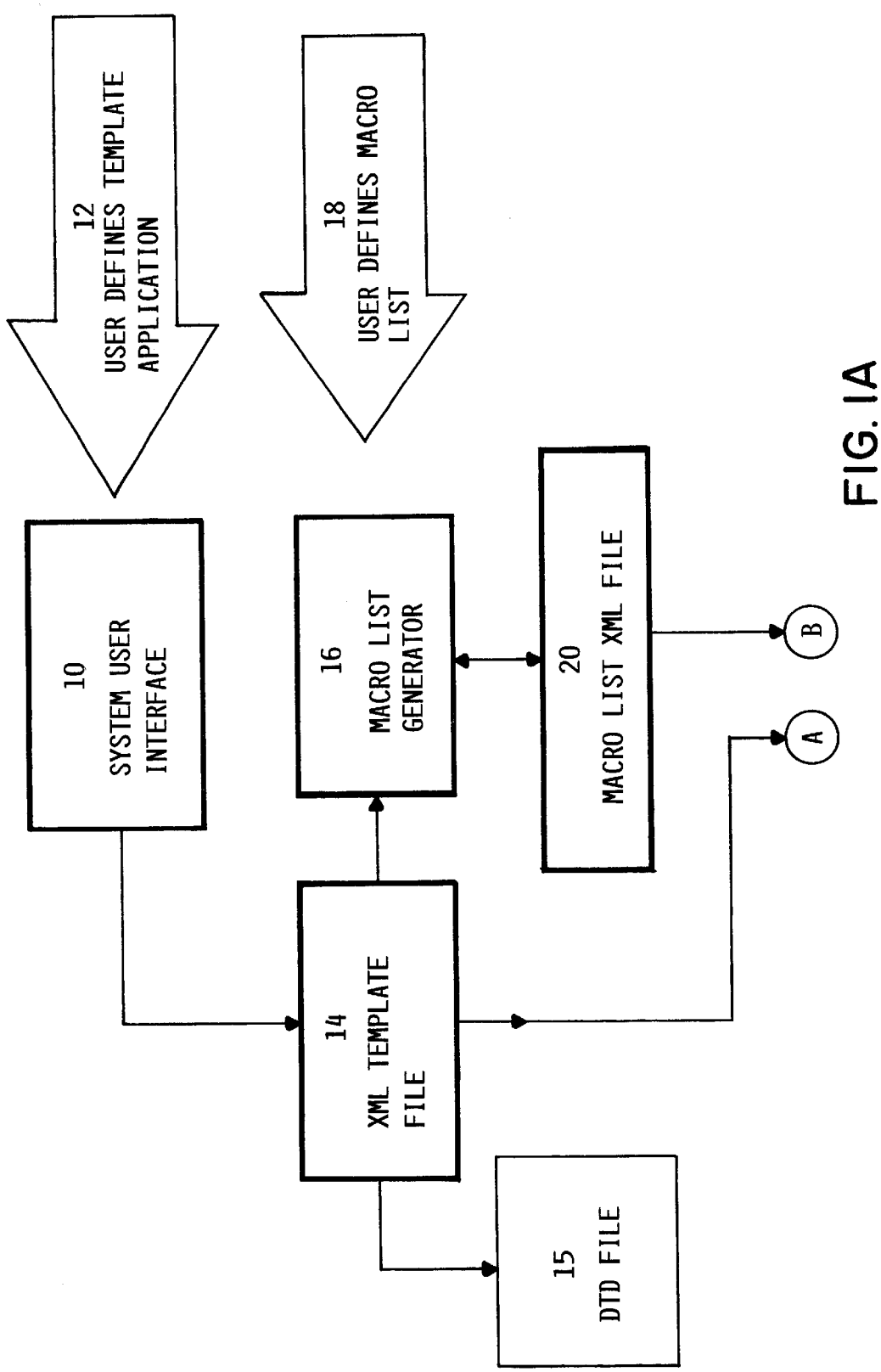
FIG. 1 is a block diagram showing the architecture of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DESCRIPTION OF THE PREFERRED EMBODIMENT

Figure 1B:
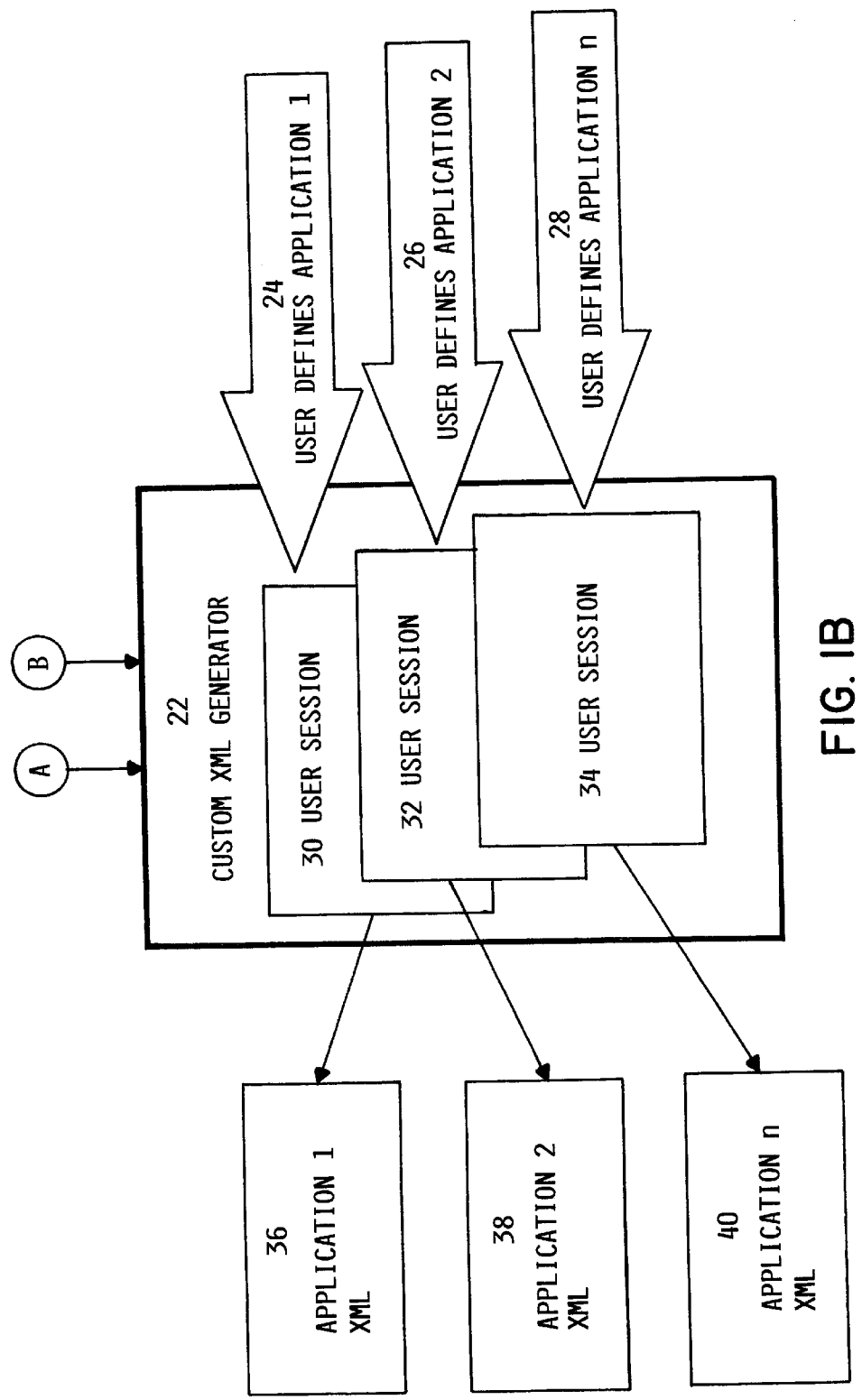

Reflecting to FIG. 1, there is shown in a block diagram the architecture of the preferred embodiment.

The preferred embodiment is described with reference to the IBM Component Broker™ system. However, it will be understood by those skilled in the art that the invention may be implemented with respect to other environments which support application creation, preferably in which an XML (or other textually-based) description of the application creation is supportable.

FIG. 1 shows a system user interface 10. This interface provides the functionality for a user to generate a specific application in a computer system. In the object-oriented model of the preferred embodiment, system user interface 10 permits the user to construct a set of objects. In use system user interface 10 may be used to construct objects and in this sense different applications may be generated directly by using the system user interface 10. In the system of the preferred embodiment an application is represented by an XML file, as described below. The XML file is used by other system components to implement an application.

In the system of FIG. 1, when system user interface 10 is used to generate an application, the system also creates an XML file which reflects the work-flow of the user in generating the application. In FIG. 1, the user input 12 is shown reflecting user input to define a template application. The system user interface 10 generates XML template file 14. XML template file 14 is shown in FIG. 1 with an associated DTD file 15. The DTD file 15 is not required in the preferred embodiment but is advantageous in permitting XML code to be defined which is able to concisely describe the user interface customization, as referred to below. XML template file 14 may represent, for example, objects created by a user for use in a system having an object request broker architecture.

XML template file 14 is used in such a system as a basis for the object request broker system to create corresponding objects for use in the system.

A further component of the system shown in FIG. 1 is macro list generator 16, which prompts for and accepts user input 18. Macro list generator 16 creates macro list XML file 20 in response to user input 18.

FIG. 1 also shows custom XML generator 22 which permits users to generate applications by prompting for and accepting user inputs, shown in FIG. 1 as user inputs 24, 26, 28 and, by way of user sessions 30, 32, 34, based on macro list XML file 20, generating applications 36, 38, 40, respectively.

Figure 2:
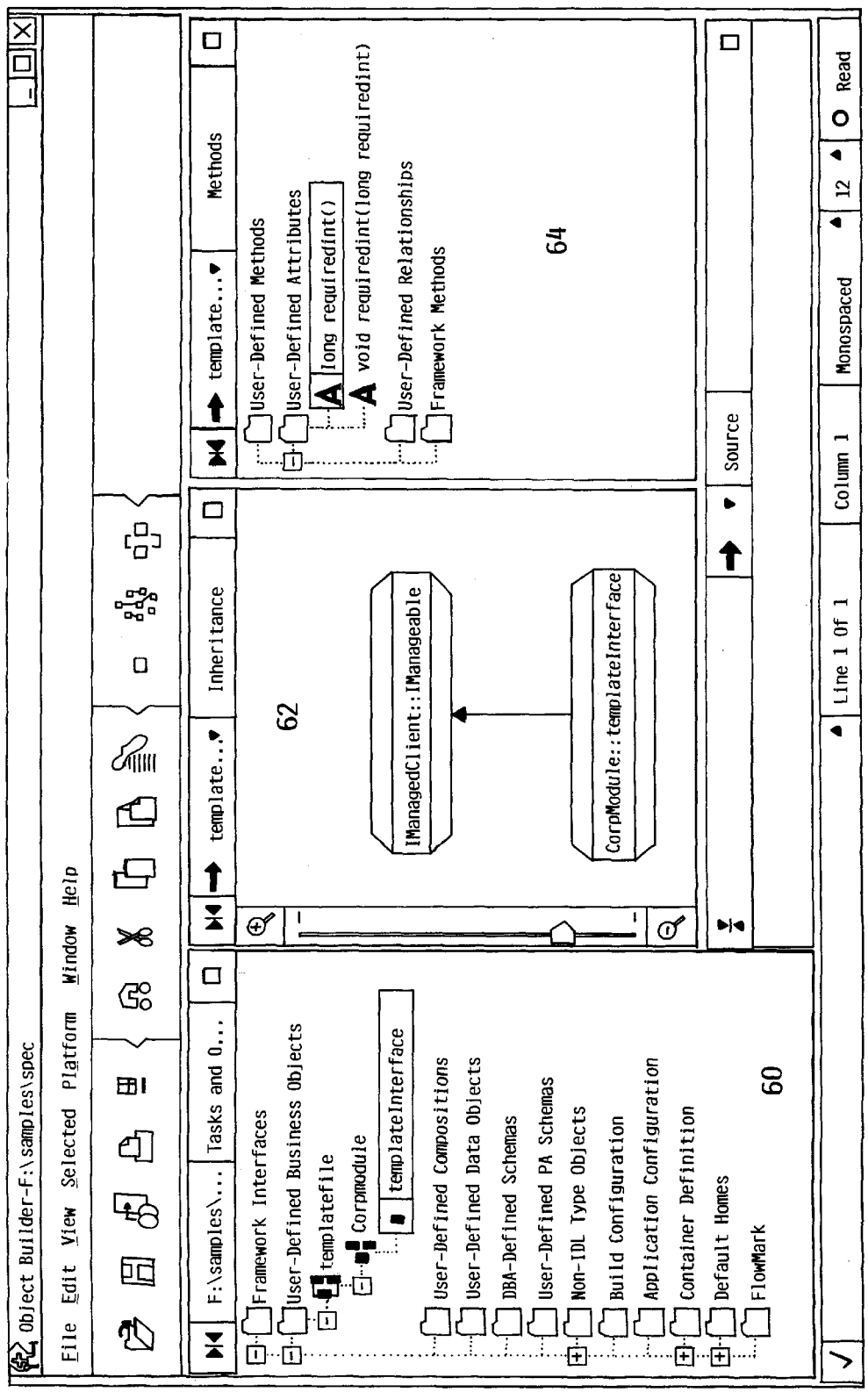
FIGS. 2–5 are screen captures representing interfaces in accordance with the preferred embodiment.

System user interface 10 may potentially be any user interface. In the preferred embodiment, system user interface 10 is a graphical, menu-based interface which permits the construction of object-oriented business applications. An example of the interface is given in FIG. 2 which represents system user interface 10 as represented to the user in an example of application creation. As can be seen from FIG. 2, system user interface 10 has task and object pane 60, inheritance pane 62, and methods pane 64. The objects being created by the user are represented in those three panes. The work-flow of the user in utilizing system user interface 10 is reflected in the graphical structure shown in pane 60. In the preferred embodiment, the graphical structure in pane 60 corresponds to an XML-compliant file of tagged text. In the preferred embodiment, an XML file of this type is shown as XML template file 14 in FIG. 1. This user interface provides an XML representation of the user's work-flow in defining objects in the object-oriented system. It is this correspondence which is utilized as described below to permit the customization of the user interface to permit automatic generation of fastpath applications.

The elements in the XML-compliant data may be defined in an XML data type definition ("DTD") file which is specific to the system. The data type definition file is defined itself in a manner consistent with the applications which the system is designed to create. This permits the work-flow of a user in creating objects in an application to be represented directly and clearly by XML data.

An XML representation of the user work-flow is shown in FIG. 1 where a user uses system user interface 10 to create a template application represented by user input 12 in FIG. 1. The template application may be simple or complex but it is advantageous for the user to include details which are to be replicated in other applications to be created by the user or other users. Similarly, it is advantageous if the user restricts the template application to only contain objects which are likely to be used in other applications.

System user interface 10 generates XML template file 14. As set out above, XML template file 14 contains elements which correspond to the objects in the application which the user has defined. The work-flow of the user is represented in XML template file 14.

Once the XML template file 14 has been created, the user may run macro list generator 16 to create macro list XML file 20. Macro list generator 16 uses XML template file 14 as input to present the user with options to customize what is to be presented to users in building subsequent applications. In the preferred embodiment, macro list generator 16 presents the user with a graphical representation of macro list XML file 20. The user may select those elements of the XML template file 14 which the user wishes to permit future applications to have customized.

Figure 3:
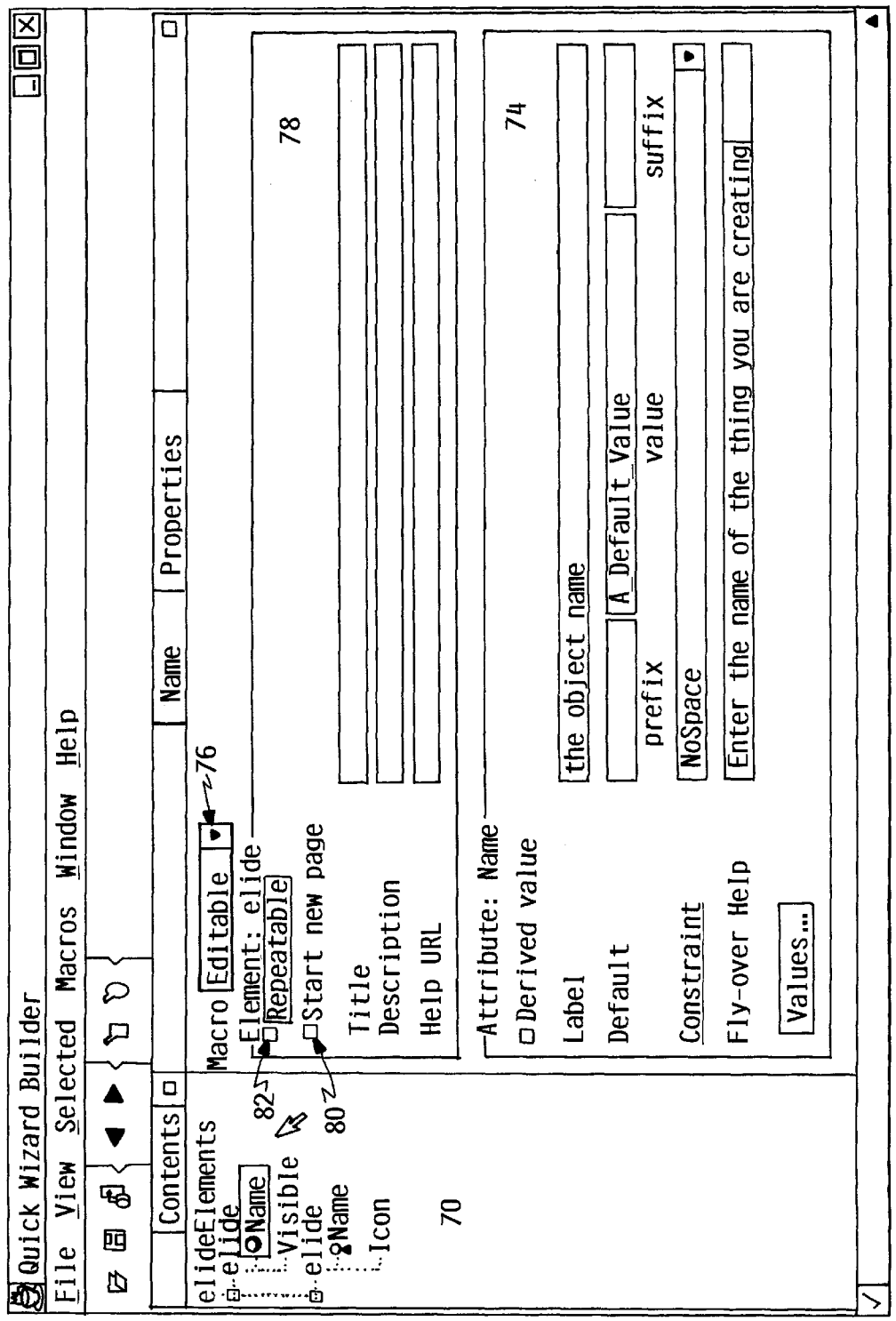

An example of what is presented to the user by macro list generator 16 is shown in FIG. 3, where in pane 70 the representation of an XML template file 14 for an example template is shown.

The example of FIG. 3 shows a set of objects created by the user originally in the system user interface. For the purposes of the example, the objects are defined as "elideElements". The details of the objects which are created by the system user interface will vary depending on the system user interface under consideration. For a system user interface used to build a component-based object oriented system, objects and tasks defined by the user may be shown in pane 70. In the example of FIG. 3 a simple object-creation example is provided. In the preferred embodiment the details of the objects defined do not determine how the system works, what is required is that the system user interface 10 generate an XML file for the objects which is persistent and which represents user interface state data.

In the example of FIG. 3, a "Name" attribute 72 is shown highlighted. Box 74 in FIG. 3 is displayed by macro list generator 16 to permit the user to define the name attribute as being customizable by future applications to be built on the template of the example. Dropdown box 76 permits the user to define the macro to be "editable" which permits the user to define prompts for display when applications are to be defined in subsequent use of the system with the fastpath application of the custom XML generator 22. Where drop down box 76 is set to "hidden" instead of "editable", applications created based on the template are given elements and attributes which are duplicates of the elements and attributes in the template.

In box 74 of FIG. 3 the user is prompted to define a label which will be presented to the user in a customized interface for defining a new application based on the template. In the example of FIG. 3, the user has entered "the object name" as the text which will label the prompt. A default value of "A_Default_Value" is shown as also having been entered in box 74 of FIG. 3. Prefix and suffix strings may also be specified by the user. The prefix and suffix definition is of use where the value for the default string is a derived value (indicated by the derived value check box in box 74). In such a case, the value may be defined to be derived from another attribute or element with a user defined prefix or suffix catenated with the derived value string.

Macro list generator 16 also provides that the data to be accepted be constrained in a user-selectable manner. In the example of FIG. 3, the constraint is selected to be "NoSpace", requiring the user to enter names which do not contain the space character. Box 74 also contains a location where text for fly-over help (hover help) may be entered.

FIG. 3 also contains box 78 which has check off box 80, to be checked where the prompting for the highlighted element (in the example of FIG. 3, "elide" 72), is to appear on a new page for the user. If check off box 80 is checked, the user may enter a title for the new page, a description to appear on the new page, and a help URL for the new page, each in the appropriate space in box 78.

Box 78 also contains check off box 82 which permits the user to define whether an element is repeatable. If the element is defined as repeatable, when the application is defined (as described below) the user will be able to replicate the element in the application.

Based on the user selection of elements and attributes presented by macro list generator 16, macro list XML file 20 is created. Macro list XML file 20 reflects modifications for XML template file 14, representing the customizable elements as defined by the user, using macro list generator 16.

The XML description for the objects in pane 70 of FIG. 3 is as follows:

<?xml version="1.0" standalone="yes"?><!DOCTYPE elideElements>
21 elideElements> <elide Name="Uuid" Visible="false"></elide> <elide Name="foo" Icon="images/domodule.gif"> </elide>
</elideElements>

This template XML code corresponds to the contents of XML template file 14 shown in FIG. 1. The template XML in the example of FIG. 3 is sufficient to represent the work flow of the user in defining the objects to be created by the system. Although in the context of the preferred embodiment, the template XML is used to permit customization of the user interface for fastpath application generation, in the context of the system itself, the XML generated by the system user interface is used to pass the user input to the system for processing (see the description of FIG. 6, below).

Note that in the example of FIG. 3, pane 70 displays the XML in a particular format as defined by macro list generator 16 in which the values contained in the template XML ("Uuid" for example) are not displayed.

A corresponding XML description relating to the objects in FIG. 3 generated by macro generator 16 is as follows:

<?xml version="1.0" standalone="no"?><!DOCTYPE macros SYSTEM
"../dtd/macro.dtd"><macros> <template href="H:\test\input.xml" />
<macro path="root( ).child(1,elide).attr(Name)" name="the object name"
default="A_Default_Value" showType="Editable" constraint="0"/>
</macros>

This macro XML code represents the contents of macro list XML file 20 as shown in FIG. 1. The code is generated by macro list generator 16 for the input as shown in FIG. 3, based on the template XML shown above. In the example of FIG. 3, as illustrated by the macro XML code above, a DTD file (corresponding to DTD file 15 in FIG. 1) is used to define the "macro" construct in the macro XML code. In the above example, the DTD file is identified as ".. /dtd/macro.dtd". The DTD file for the preferred embodiment includes definitions of XML constructs which are specific to the macro list generator tasks. For example the DTD file contains the following:

<|ATTLIST macro
[ . . . ].
showType (Hidden|Editable|Readonly) "Editable"
[ . . . ]
>

The elipses above indicate redacted portions of the DTD definition. This definition, for example, permits the data entered by the user (user input 18) in running macro list generator 16 to be directly reflected in a "macro" statement in macro list XML file 20 by a showType value corresponding to the user's input. As will be apparent, different DTD files will be desirable for different system user interfaces.

The "template" statement in the above macro XML code identifies the location of the XML template file to which the macro file will refer. In this case, the "H:\test\input.xml" location refers to the file containing the template XML code shown above.

The "macro" statement in the above macro XML code contains the "path" component which identifies a location in the template XML file. In the example above, the path points to the first "name" attribute in the template XML code. The macro XML code above includes "the object name" string which reflects the entry made by the user as shown in FIG. 3 for the label for attribute name. The user provided default is also reflected in the macro XML code ("A_Default_Value"). The "showType" is set in the macro XML code based on the user's input as shown in drop down box 76 in FIG. 3. Similarly the "constraint" information is shown in the macro XML code above, reflecting the user entry in response to the prompt from the macro list generator.

As will be appreciated, the macro list XML file 20 will differ for different system. It is required that macro list generator 16 creates a file which is able to be parsed by custom XML generator 22. In fact, the output of macro list generator 16 may have any format which can be read by custom XML generator 22. In the preferred embodiment, an XML file is used and DTD file 15 is used to define XML code which permits the output of macro list generator 16 to be tailored to the function of passing user information relating to XML template file 14 to custom XML generator 22.

When a macro list XML file 20 has been defined by the user, it is then possible for the user to run custom XML generator 22 to define applications. Custom XML generator 22 effectively displays customized user interfaces by displaying prompts to the user based on macro list XML file 20. In cases where there are no editable macros defined for a set of objects, the system will replicate the original template application as defined in XML template file 14, with no customized aspects.

Where, as in the example of FIG. 3, the user does define customizable aspects to the application generation, pages are displayed by the macro list generator 16 which permit customization of the application being generated. An example of such a page is found in FIG. 4. In the preferred embodiment, custom XML generator 22 uses the value of "showType" in macro list XML file 20 to determine whether a particular element or attribute will be presented to the user. If the showType is "editable" then the element or attribute will be presented with an entry field which the user can use to enter a value. A default value, if defined, will be displayed. Where the showType is "readonly" a default value or a derived value will be displayed without the opportunity for the user to modify the value. When the showType is "hidden" nothing is displayed for the user.

Figure 4:
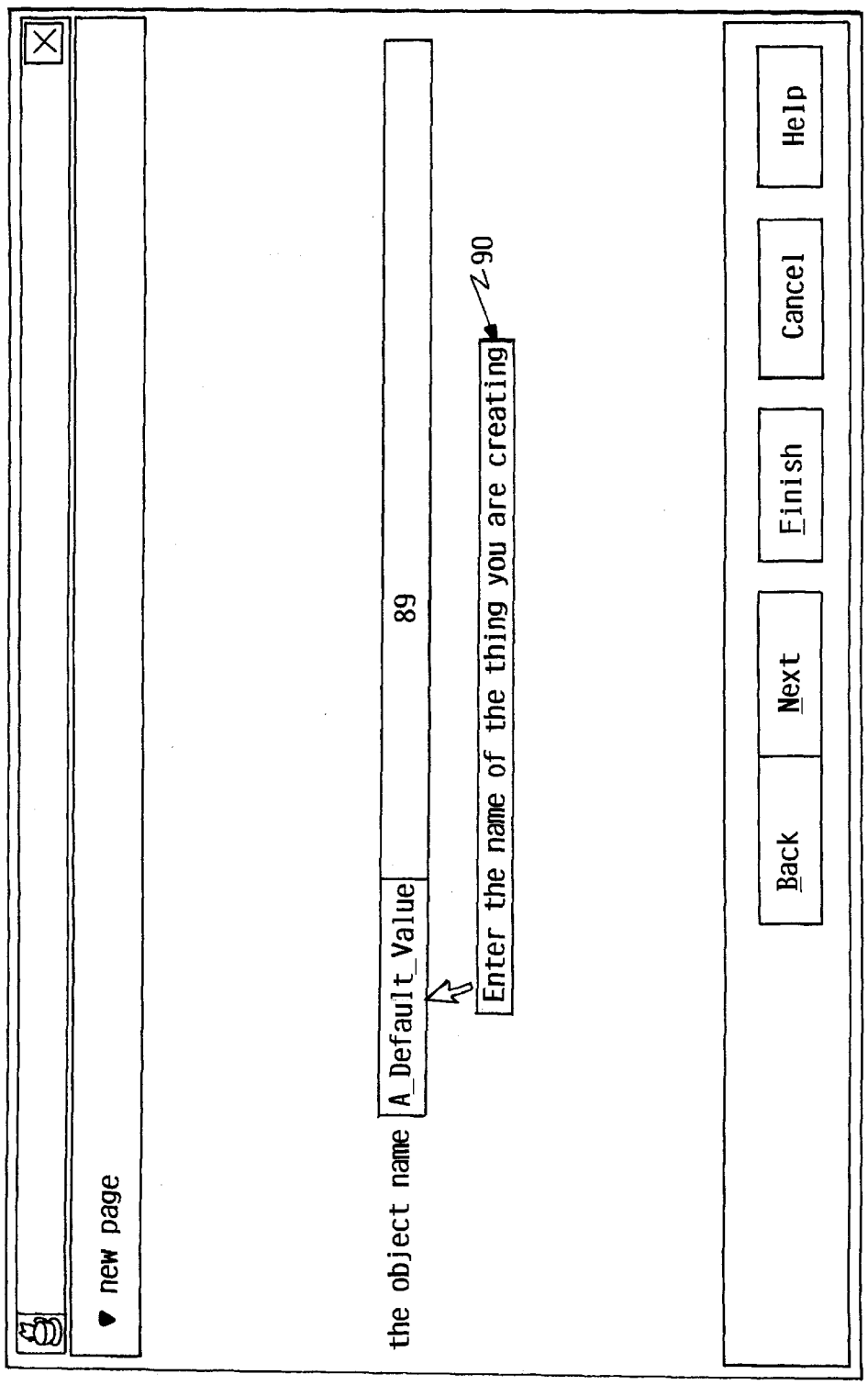

FIG. 4 shows the screen displayed for a user by custom XML generator 22 based on the user inputs as shown in FIG. 3, where the name attribute is not repeatable. FIG. 4 shows the label as being "the object name" with entry field 89. Hover help 90 is shown defined as "Enter the name of the thing you are creating" as shown in FIG. 3. The user in FIG. 4 is able to give a value to "the object name". The default value "A_Default_Value" as defined in FIG. 3 is presented to the user in entry field 89. In this way, what are defined by the user in FIG. 3 to be the customizable aspects of the application are presented to the user to permit fastpath application building.

Figure 5:
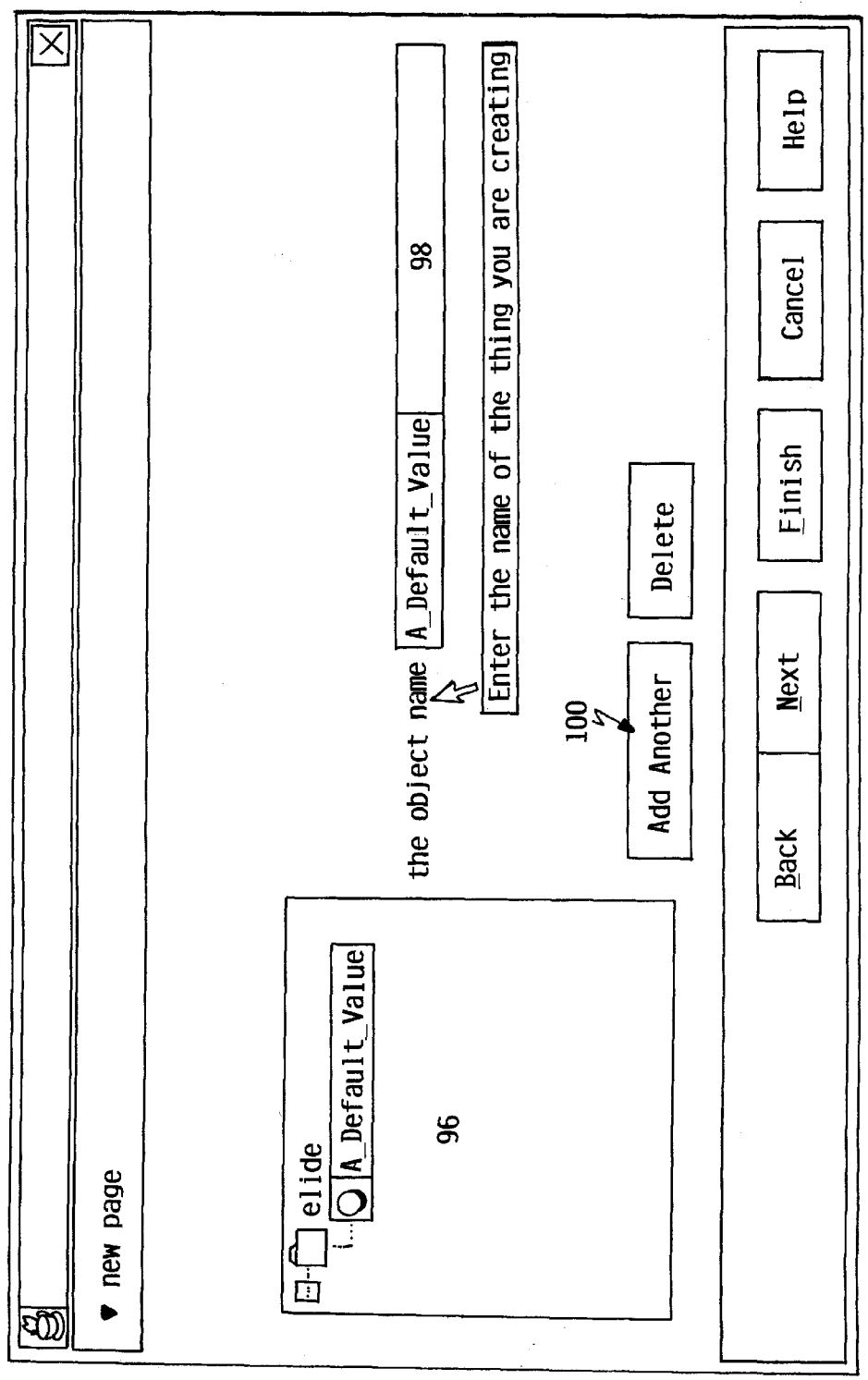

FIG. 5 shows a similar screen presented to the user but in FIG. 5 the object being defined by the user is repeatable. In this case, the user is presented with a tree-structured graphical representation of the objects being created by the user in box 96. The label and entry field 98 have the same function as the label and entry field 89 shown in FIG. 4. In FIG. 5, however, button 100 is provided to permit the user to add other objects to what is being developed. The defined objects are shown in the tree of box 96 and new objects may be defined using entry field 98.

In the example shown in FIG. 4, if the user replaces "A_Default_Value" in entry field 89 with "User_Provided_Name", the XML file which is generated by the custom XML generator will be as follows:

<?xml version="1.0" standalone="yes"?>
<!DOCTYPE elideElements>
<elideElements>
<elide Name="User_provided_name" Visible="false"/>
<elide Name="foo" Icon="images/domodule.gif"/>
</elideElements>

As can be seen, the application as originally defined by the user and reflected in the XML template code listed above, has been replicated but with the customization that the first Name attribute has been given the value "User_provided_name", instead of the value "Uuid" which it had in the template XML code.

In the example of FIG. 1, user input 24 to custom XML generator 22 is used by the custom XML generator, in addition to the information contained in the macro list file 20, to generate application XML 36 which is based on the template application of user input 12, but which has been customized by the user in accordance with the prompts defined by user input to macro list generator 16. Other application XMLs 38, 40 are similarly created by users defining the customizable elements as originally selected by user of the macro list generator 16.

As can be seen by the above description, in the system of the preferred embodiment, an application is defined itself in XML code. This is shown in FIG. 6, which represents the architecture of the system as seen from the user perspective.

Figure 6:
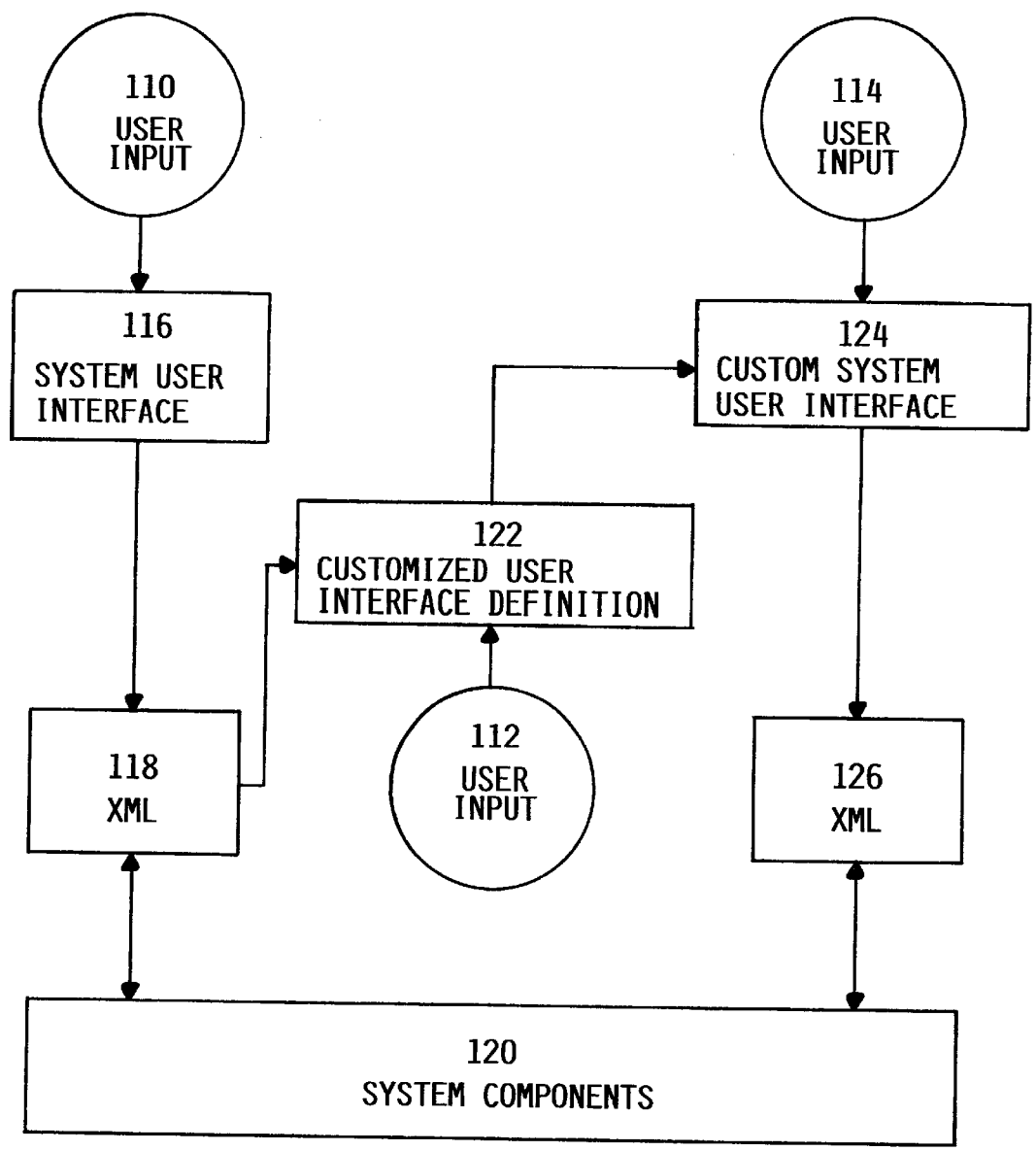
FIG. 6 is a block diagram showing the architecture of the preferred embodiment from a user oriented perspective.

FIG. 6 has user inputs 110, 112, 114. User input 110 for system user interface 116 results in XML 118. System components 120 then use XML 118 to drive system operations. In FIG. 6, user input 110, system user interface 116 and XML 118 correspond to user input 12, system user interface 10 and XML template file 14, shown in FIG. 1. XML 118 represents the application defined by the user by user input 110 to system user interface 116.

In addition, XML 118 is used to drive the customized user interface definition 122. In terms of FIG. 1, customized user interface definition 122 represents macro list generator 16 and macro list XML file 20. User input 112 is used to create what is seen by the user as custom system user interface 124. What is seen by the user as the custom system user interface is generated by the custom XML generator in FIG. 1. User input 114 is provided (as is shown in FIGS. 4, 5) to generate a fastpath application, represented in FIG. 6 as XML 126. XML 126 represents an application in the same manner as does XML 118. The fastpath for generating XML 126 is by custom system user interface 124 which uses XML 118 as a template and permits customization as defined by user input 112.

In this way it is possible to quickly define applications which are based on the user-defined template, but which are customizable in a manner defined by the user. In the preferred embodiment, different customization options may be defined for the same template, allowing different potential users to make differing versions of the template.

XML template file 14 could be used directly as macro list XML file 20, where the subsequent applications are duplicates of the template application. However, in most cases it is expected that users will benefit from the ability to use the macro list approach described above.

Although a preferred embodiment of the present invention has been described here in detail, it will be appreciated by those skilled in the art, that variations may be made thereto, without departing from the spirit of the invention or the scope of the appended claims.

What is claimed is:

1. A computer program product for generating user interfaces comprising a system user interface that accepts input from a user, the system user interface generating template data reflecting the work-flow defined by input from the user;

a macro list generator that displays a representation of the template data and for accepting input representing user preferences for interface customization based on the template data, the macro list generator generating macro list data reflecting the input representing user preferences for interface customization; and a custom interface generator that presents a customized interface to the user, the customized interface comprising prompts derived from the macro list data, the customized interface generator accepting input from the user in response to the customized interface prompts and further comprising an application generator for generating application data corresponding to the template data as modified to reflect responses of the user to the customized interface prompts.

2. The computer program product of claim 1 in which the template data and the application data each comprises XML-compliant code.

3. The computer program product of claims 1 or 2 in which the macro list data comprises XML-compliant code.

4. The computer program product of claim 3 further comprising a data type definition file associated with the XML-compliant code of the template data, the application data and the macro list data.

5. The computer program product of claim 4 further comprising prompts for user preferences for customization of the template data comprising a set of selected prompts selected for a master set of prompts comprising prompts for interface labels, interface descriptions, attribute default values, element default values, input field prefixes, input field suffixes, element repeatability, input field constraints, help text, interface new page control, and help file location and in which the set of selected prompts is defined by the contents of the data type definition.

6. The computer program product of claim 2 in which the accepting input representing user preferences further comprises prompting for each element and attribute defined in the XML-compliant code of the template data.

7. The computer program product of claim 1 in which the system user interface comprises a graphical user interface for creation of objects in an object-oriented programming environment.

8. The computer program product of claim 1 further comprising prompts for user preferences for customization of the template data comprising a set of prompts selected from a master set of prompts comprising prompts for interface labels, interface descriptions, attribute default values, element default values, input field prefixes, input field suffixes, element repeatability, input field constraints, help text, interface new page control, and help file location.

9. A computer system comprising a graphical system user interface that accepts input from a user to create objects in an object-oriented computing environment, the system user interface generating a template file reflecting the work-flow defined by input from the user;

a macro list generator that displays a representation derived from the template file and for accepting input representing user preferences for interface customization based on the template file, the macro list generator generating a macro list file reflecting the input representing user preferences for interface customization; and a custom interface generator that presents a customized interface to the user, the customized interface comprising prompts derived from the macro list data, the customized interface generator accepting input from the user in response to the customized interface prompts and further comprising an application generator for generating an application file corresponding to the template file as modified to reflect responses of the user to the customized interface prompts.

10. A method for generating fastpath applications comprising the steps of:

accepting input from a user;

generating template data reflecting the work-flow defined by input from the user;

displaying a representation of the template data;

accepting input representing user preferences for interface customization based on the template data;

generating macro list data reflecting the input representing user preferences for interface customization;

presenting a customized interface to the user, the customized interface comprising prompts derived from the macro list data;

accepting input from the user in response to the customized interface prompts; and generating application data corresponding to the template data as modified to reflect responses of the user to the customized interface prompts.

11. An article of manufacture comprising a computer usable medium having computer readable program code embodied therein, the computer readable program code in said article of manufacture comprising computer readable program code for causing a computer to carry out the steps in the method of claim 10.

12. A method for generating fastpath applications comprising the steps of:

accepting input from a user to create objects in an object-oriented computing environment;

generating a template file reflecting the work-flow defined by input from the user;

displaying a representation derived from the template file;

accepting input representing user preferences for interface customization based on the template file;

generating a macro list file reflecting the input representing user preferences for interface customization;

presenting a customized interface to the user, the customized interface comprising prompts derived from the macro list data, the customized interface generator accepting input from the user in response to the customized interface prompts; and generating an application file corresponding to the template file as modified to reflect responses of the user to the customized interface prompts.

13. An article of manufacture comprising a computer usable medium having computer readable program code embodied therein, the computer readable program code in said article of manufacture comprising computer readable program code for causing a computer to carry out the steps in the method of claim 12.

14. A computer program product for use with an object-oriented computer system, said computer program product comprising: a computer usable medium having computer readable program code embodied in said medium for automatic application generation, said computer program product comprising:

computer readable program code that causes a computer to accept input from a user;

computer readable program code that causes a computer to generate template data reflecting the work-flow defined by input from the user;

computer readable program code that causes a computer to display a representation of the template data;

computer readable program code that causes a computer to accept input representing user preferences for interface customization based on the template data;

computer readable program code that causes a computer to generate macro list data reflect the input representing user preferences for interface customization;

computer readable program code that causes a computer to present a customized interface to the user, the customized interface comprising prompts derived from the macro list data;

computer readable program code that causes a computer to accept input from the user in response to the customized interface prompts; and computer readable program code that causes a computer to generate application data corresponding to the template data as modified to reflect responses of the user to the customized interface prompts.

15. A computer program product for use with an object-oriented computer system, said computer program product comprising:

a computer usable medium having computer readable program code embodied in said medium for automatic application generation, said computer program product comprising:

computer readable program code that causes a computer to accept input from a user to create objects in an object-oriented computing environment;

computer readable program code that causes a computer to generate a template file reflecting the work-flow defined by input from the user;

computer readable program code that causes a computer to display a representation derived from the template file;

computer readable program code that causes a computer to accept input representing user preferences for interface customization based on the template file;

computer readable program code that causes a computer to generate a macro list file reflecting the input representing user preferences for interface customization;

computer readable program code that causes a computer to present a customized interface to the user, the customized interface comprising prompts derived from the macro list data, and accepting input from the user in response to the customized interface prompts; and computer readable program code that causes a computer to generate an application file corresponding to the template file as modified to reflect responses of the user to the customized interface prompts.

\* \* \* \* \*